Dec. 18, 1928.
A. B. SHULTZ
1,695,933
SHOCK ABSORBER
Filed Dec. 5, 1921
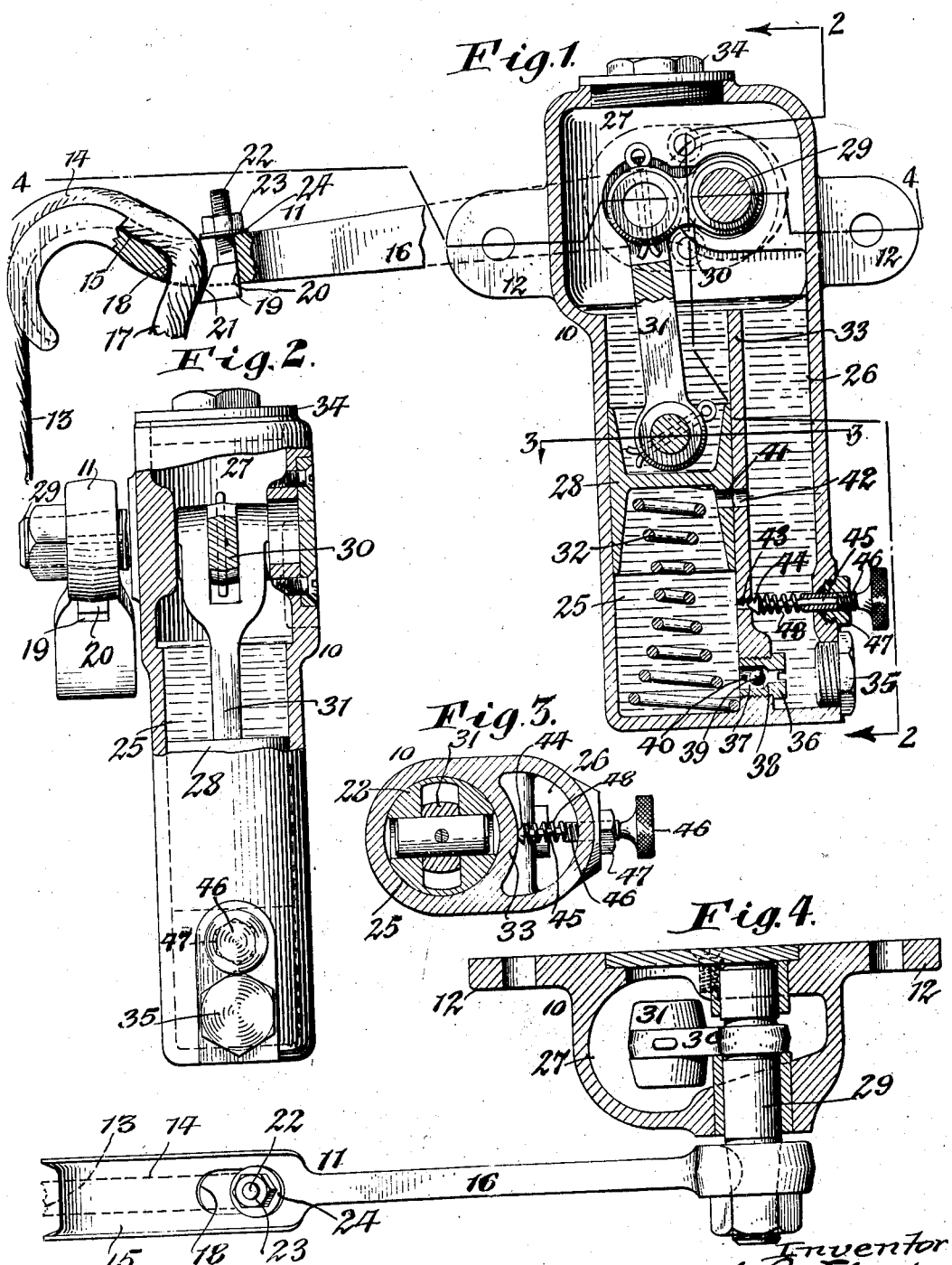
Inventor
Albert B. Shultz,
by Geyer Popp
Attorneys Patented Dec. 18, 1928.

1,695,933

UNITED STATES PATENT OFFICE.

ALBERT B. SHULTZ, OF BUFFALO, NEW YORK.

SHOCK ABSORBER.

Application filed December 5, 1921. Serial No. 519,839.

This invention relates to a shock absorber which is more particularly designed for use between the axle and body of automobiles for cushioning the rebound of the same, although the same may also be employed elsewhere to advantage.

It is the object of this invention to provide a shock absorber of this character which is simple and inexpensive in construction, which operates efficiently to check rebound of the load, and which is so designed that the same offers practically no resistance while the relatively movable parts of the car are in their neutral position and thus permits the springs of the car to carry the load easily and freely and without interference from the shock absorber but which offers a considerable resistance during the latter half of the rebound movement in order to effectively cushion the same, and then offers the maximum resistance during the last part of the rebound movement and thus transmit the load gradually from one of the movable members to the other during a heavy rebound action.

In the accompanying drawings: Figure 1 is a fragmentary vertical section of an approved embodiment of my invention. Figure 2 is a vertical section of the same taken on line 2—2, Fig. 1. Figures 3 and 4 are horizontal sections taken on the correspondingly numbered lines in Fig. 1.

Similar characters of reference refer to like parts throughout the several views.

10 represents a shell or enclosing casing which is adapted to be connected with one of the relatively movable members of an automobile such for instance as the frame of the car, and 11 an operating rock lever which operates the mechanism within the casing and is adapted to be connected with another relatively movable member of the car, such for instance as an axle. The casing in this instance is provided with lugs 12 whereby the same may be connected with the frame of the car. The rock lever has the inner end of its body connected with the mechanism within the case while its outer end is adapted to be adjustably connected with the axle or other member of the car by means which are constructed as follows:

13 represents a connecting line preferably of flexible material such as a cable made of strands of wire twisted together. One end of this cable is connected with the axle of the car in any suitable manner and near its opposite end the same has a curved part 14 which passes around a curved seat 15 on the outer end of the body 16 of the operating lever and extends with its reversely projecting upper extremity 17 downwardly through an opening or slot 18 formed in the operating lever between the body and seat thereof. This curved end of the operating line is adjustably secured in said opening 17 by gripping the same between the outer end of this opening and a clamping device mounted on the operating lever, which clamping device in its preferred form consists of a clamping block 19 arranged in the inner part of the opening 18 and having a straight rear side 20 engaging with the inner end of said opening and an inclined front side 21 engaging with the rear side of the flexible line, as shown in Fig. 1. The clamping block is detachably held in place by a screw threaded shank 22 projecting upwardly from the narrow end of the clamping block and a screw nut 23 arranged on the threaded shank and bearing by means of an interposed washer 24 against the adjacent side of the operating lever. By this means the cable can be readily adapted to relative location of the axle and frame and then reliably secured to the operating lever in a manner which is simple and effective and does not detract from the appearance of the car.

Within one side of the casing is formed an upright cushion cylinder 25, on the other side thereof the same has a liquid reservoir 26, and at its upper end the same has a dome 27 whereby the upper ends of the cylinder and reservoir are placed in communication. A piston 28 reciprocates vertically in the cylinder the movement of this piston being derived from the operating arm 11 in response to the relative movement of the axle and frame of the car.

The preferred means for connecting the piston and the operating lever comprise a rock shaft 29 journaled horizontally and transversely in the dome or upper part of the casing above the cylinder and reservoir and having one end extending outside of the casing, and a rock arm 30 secured to the rock shaft within the casing and connected by a link 31 with the piston. The piston is moved upwardly or backwardly in the cylinder by a spring 32 arranged in the lower part of the cylinder and bearing at its upper and lower ends respectively against the piston and the bottom of the cylinder, as shown in Fig. 1.

A charge of resistance liquid, preferably oil, glycerine or the like, is placed in the space within the casing so as to fill the cylinder, reservoir and the lower part of the dome and thus maintain the liquid level above the upper end of the wall 33 between the cylinder and reservoir. This liquid is introduced through an opening in the top of the casing which is normally closed by a plug or cap 34 and the same may be drained therefrom when necessary through an opening in the side of the reservoir which is normally closed by a plug 35.

In the lower part of the wall 33 between the cylinder and reservoir is arranged a resistance check valve which is constructed to permit the liquid to flow freely from the lower end of the reservoir into the cylinder but prevent the same from flowing from the lower end of the cylinder into the reservoir. Although this check may be variously constructed the same consists preferably of a bushing 36 secured by a screw joint in the lower end of the wall 33 and having a port 37 extending from the reservoir to the cylinder and a valve seat 38 facing toward the cylinder and a ball valve 39 arranged on said resistance port 37 and movable toward and from said seat 38 and held against displacement by a retaining pin 40.

Midway between the upper and lower ends of the stroke of the piston communication is established between the cylinder and piston by means of a relief port 41 formed in the lower part of the body of the piston and a relief port 42 arranged in the wall 33 and leading from the cylinder to the reservoir when the piston is in the central position of its longitudinal movement. Between the relief port 42 and the resistance check valve a resistance regulating valve is arranged in the wall 33 between the cylinder and reservoir which may be made of any approved construction but preferably consists of a regulating port 43 arranged in the wall 33 and leading from the cylinder to the reservoir, a conical valve 44 normally engaging with the regulating port at the end toward the reservoir and provided with a valve stem 45, an adjusting screw 46 working in a gland 47 arranged in an opening in the outer wall of the reservoir in line with the regulating port and having a hollow inner end which receives said valve stem, and a spring 48 arranged between said adjusting screw and regulating valve and operating to hold the latter yieldingly against its seat around the outer end of the regulating valve for closing the latter part of the time.

While the automobile is running under a normal load and over a fairly even road the piston reciprocates only to a comparatively small extent in its central or neutral position midway between the ends or extremes of its stroke, substantially as represented in Fig. 1, at which time the relief ports 41, 42 in the piston and wall 33 are in register and liquid is free to pass back and forth between the lower end of the cylinder and the reservoir. No appreciable checking effect is therefore exerted at this time upon the vertical movement of the frame and axle of the car relatively to each other so that at this time the ordinary spring system of the car takes care of the load both during shock and rebound.

When, however, the piston is moved upwardly or backwardly a considerable extent under the effect of a greater shock the body of the piston closes the port 42 in the wall 33 and a correspondingly larger volume of liquid is drawn from the reservoir past the check valve and into the lower end of the cylinder. During the subsequent downward or forward movement of the piston upon the rebound action of the axle and frame relative to each other the check valve is closed, whereby the liquid is confined in the lower part of the cylinder and resists the descending or forwardly moving piston which is pressing against the same, thereby cushioning or absorbing the shock during the rebound. If the piston does not fit closely in the cylinder or is worn to some extent, some of the liquid will leak past the same from the lower to the upper end of the cylinder and thus permit the piston to descend gradually. From the middle of the downward stroke of the piston to about three fourths of this stroke the liquid in the lower end of the cylinder is subjected to the pressure of the piston and the downward movement of the latter is retarded accordingly until the resistance of the regulating spring 48 is overcome and when this occurs the regulating valve 44 is opened and permits part of the resistance liquid to escape from the cylinder and thus ease the rebound. During the last part of the downward or forward movement of the piston the body of the same covers the regulating port 43 and engages with the solid body of liquid which is confined in the lower or front end of the cylinder, except such as escape due to leakage, whereby the maximum resistance is offered to the movement of the axle and frame when the severest rebound occurs following a shock of greatest violence, thereby causing this shock to be gradually and effectively absorbed and prevented from being transmitted to any objectionable extent to the frame and the load or occupants of the car.

From the foregoing it will be apparent that this device permits a car to ride freely and easily under normal conditions and utilize the resilience of the ordinary spring system without hinderance from the shock absorber, but when either a moderate or a severe shock is received by the car the same will be cushioned by an absorbing effect which gradually increases in proportion to the force of the shock so that no objectionable shock will follow and the car and its load or passengers are relieved accordingly.

It will be noted from the foregoing description that supplemental means are provided in this shock absorber which are operable only when the piston is in proximity to the normal position in order to establish a balanced pressure between the fluid in the cylinder and the reservoir in this relative position of the parts.

This organization of shock absorber also provides means for causing the fluid to resist the movement of the piston in one direction, also supplemental means for establishing, in effect, restricted communication between said reservoir and cylinder when the piston is in normal position, and also means for rendering said supplemental communication inoperative upon movement of the piston beyond a predetermined distance from said normal position.

I claim as my invention:

1. A shock absorber adapted to be arranged between two relatively movable members, comprising a cylinder adapted to be connected with one of said members, a piston arranged in said cylinder and adapted to be connected with the other member, and a liquid reservoir, said piston having a port and said cylinder having a port leading to said reservoir, said ports being adapted to register and place said cylinder and reservoir in communication with each other during the central part of the stroke of said piston in the cylinder but to cut off communication through these ports between the cylinder and reservoir when the piston is at either end of its stroke.

2. A shock absorber adapted to be arranged between two relatively movable members, comprising a cylinder adapted to be connected with one of said members, a piston movable in said cylinder and adapted to be connected with the other member, a liquid reservoir, and means which permit the passage of fluid from the reservoir into the cylinder during the backward stroke of the piston and which permit the passage of liquid from the cylinder into the reservoir during the first part of the forward stroke of the piston but prevent the passage of liquid from the cylinder into the reservoir during the last part of the forward stroke of the piston, said means comprising a check valve arranged between the front ends of the cylinder and reservoir and opening toward the cylinder but closing toward the reservoir.

3. A shock absorber adapted to be arranged between two relatively movable members comprising a cylinder adapted to be connected with one of said members, a piston movable lengthwise in said cylinder and adapted to be connected with the other member, a liquid reservoir, a resistance check valve arranged between the front end of said cylinder and the reservoir and opening toward said cylinder, said piston and cylinder being provided with relief ports which are adapted to register during the middle part of the stroke of the piston and place the cylinder and reservoir in communication with each other for reducing the resistance to the movement of the piston during this part of the stroke, and a regulating valve connecting the cylinder with said reservoir, between said check valve and said relief ports.

4. A shock absorber comprising a fluid-containing reservoir, a cylinder, a piston reciprocable in said cylinder, means permitting a substantially free flow of fluid from said reservoir into said cylinder upon movement of the piston in one direction and for restricting the flow of fluid from the cylinder into said reservoir upon movement of the piston in the opposite direction and supplemental means operable only when the piston is in proximity to normal position to establish balanced pressure between the fluid in the cylinder and the reservoir.

5. A shock absorber comprising a fluid-containing reservoir, a cylinder having communication therewith, a piston reciprocable in said cylinder, means for causing the fluid to resist the movement of the piston in one direction, and supplemental means establishing restricted communication between said reservoir and cylinder when the piston is in normal position and means for rendering said supplemental communication inoperative upon movement of the piston beyond a predetermined distance from said normal position.

6. A shock absorber comprising a fluid-containing reservoir, a cylinder, a piston reciprocable in said cylinder, means permitting a substantially free flow of fluid from said reservoir into said cylinder upon movement of the piston in one direction, means restricting the flow of fluid from the cylinder into said reservoir upon movement of the piston in the opposite direction, a supplemental passage leading from said reservoir into said cylinder permitting a restricted flow of the fluid between said reservoir and cylinder during relatively slight movements of the piston from its normal position, and means for closing said passage when the piston moves beyond a predetermined distance from said normal position.

7. A shock absorber comprising a fluid-containing reservoir, a cylinder, a piston reciprocable in said cylinder, means permitting a substantially free flow of fluid from said reservoir into said cylinder upon movement of the piston in one direction, means restricting the flow of fluid from the cylinder into said reservoir upon movement of the piston in the opposite direction, a supplemental passage of relatively small effective area leading through the wall of said cylinder into said reservoir normally permitting a restricted flow of fluid between said reservoir and cylinder in either direction upon relatively slight reciprocative movements of said piston from its normal position, and means operable by the movement of the piston to close said passage when the piston moves beyond a predetermined distance from normal position.

ALBERT B. SHULTZ.